United States Patent [19]
Oishi

[11] Patent Number: 5,886,859
[45] Date of Patent: Mar. 23, 1999

[54] MAGNETIC DISC CARTRIDGE

[75] Inventor: Kengo Oishi, Kanagawa-ken, Japan

[73] Assignee: Fuji Photo Film Co., Ltd., Japan

[21] Appl. No.: 879,869

[22] Filed: Jun. 20, 1997

[30] Foreign Application Priority Data

Jun. 21, 1996 [JP] Japan .................................. 8-161695

[51] Int. Cl.$^6$ ................................................. G11B 23/033
[52] U.S. Cl. .......................................................... 360/133
[58] Field of Search ..................................... 360/133, 132

[56] References Cited

U.S. PATENT DOCUMENTS 5,548,571 8/1996 Mistretta ................................. 360/133

*Primary Examiner*—Robert S. Tupper
*Attorney, Agent, or Firm*—Brinks, Hofer Gilson & Lione

[57] ABSTRACT

A magnetic disc cartridge has a magnetic disc medium contained for rotation in a casing having a magnetic head insertion opening for giving a magnetic head access to the magnetic disc medium and a shutter member for opening and closing the magnetic head insertion opening. The casing has a first distinguishing hole which is formed in the vicinity of a corner of the casing and represents a reference storage capacity and at least one second distinguishing hole formed with its center positioned on a second straight line which is parallel to a first straight line passing through the center of the first distinguishing hole in parallel to a side edge of the casing and is off from the first straight line inward or outward by a predetermined amount. A disc drive system can distinguish the storage capacity of the magnetic disc medium contained in the casing on the basis of the first and second distinguishing holes.

9 Claims, 2 Drawing Sheets

MAGNETIC DISC CARTRIDGE

BACKGROUND OF THE INVENTION

1. Field of the Invention

This invention relates to a magnetic disc cartridge which contains a magnetic disc medium having a storage capacity different from those of conventional magnetic disc cartridges and is provided with one or more holes for distinguishing the magnetic disc cartridge from other magnetic disc cartridges.

2. Description of the Related Art

There has been known a magnetic disc medium, a so-called floppy disc, which comprises magnetic layers formed on opposite sides of a flexible disc base of a polyester sheet or the like. Information is recorded on the floppy disc by a magnetic head while rotating the floppy disc. The floppy disc is generally contained in a thin casing and is used in the form of a magnetic disc cartridge. Such magnetic disc cartridges have been mainly used as recording media for computers because they are easy to handle and can be produced at low cost.

Recently the storage capacity of the magnetic disc medium of the magnetic disc cartridge has been increased by change in the recording system, improvement of the magnetic layer and the like. When a magnetic disc cartridge having a larger storage capacity is provided and introduced into the market, it is necessary for the larger capacity magnetic disc cartridge to be provided with a function of distinguishing itself from the magnetic disc cartridges having the conventional standard storage capacity (e.g., 3.5-inch floppy disc cartridge having a storage capacity of 1 MB to 2 MB).

As a means for distinguishing magnetic disc cartridges of different storage capacities from each other, there has been known a system involving one or more through or blind holes formed in the casing to be detectable mechanically or optically. For example, in the case of 3.5-inch magnetic disc cartridges, a distinguishing hole for distinguishing those of 2 MB from others is formed in a rear corner of the casing (one of the corners on the edge of the casing remote from the shutter). In the case of magnetic disc cartridges of 10 MB and 21 MB, such a distinguishing hole is formed adjacent to the shutter.

In the case of novel magnetic disc cartridges of a large storage capacity such as of 100 MB or more, the vicinity of the space where the distinguishing hole for 10 MB or 21 MB is to be formed is too narrow to form a distinguishing hole for the large storage capacity and accordingly it is preferred that the distinguishing hole for the large storage capacity be formed on a rear (as seen in the direction of insertion of the magnetic disc cartridge) edge portion of the casing remote from the shutter.

Further in order to prevent accidental erasure of recorded information on the novel magnetic disc cartridge when the novel magnetic disc cartridge is loaded in a disc drive system for conventional magnetic disc cartridges, a first distinguishing hole is formed in the part corresponding to the part of the conventional magnetic disc cartridge (e.g., of 2 MB) where a write protector is provided, and the first distinguishing hole functions as a distinguishing hole representing a reference storage capacity different from the storage capacity of the conventional magnetic disc cartridges.

In view of assembly of disc drive systems and the manufacturing cost, it is advantageous that sensors for detecting the distinguishing holes of the magnetic disc cartridge are collectively provided in the disc drive systems.

Further a disc drive system is generally provided with a medium sensor which extends in parallel or perpendicular to the direction of insertion of a magnetic disc cartridge near the write protector or the first distinguishing hole and the disc drive system detects that a magnetic disc cartridge is loaded therein.

The distinguishing holes for distinguishing the novel magnetic disc cartridge having a larger storage capacity should be provided not to interfere with the medium sensor. Otherwise malfunction of the disc drive system can be caused.

SUMMARY OF THE INVENTION

In view of the foregoing observations and description, the primary object of the present invention is to provide a magnetic disc cartridge in which distinguishing holes for distinguishing a novel magnetic disc cartridge containing therein a magnetic disc medium having a larger storage capacity from other magnetic disc cartridges are arranged in an optimum manner.

In accordance with the present invention, there is provided a magnetic disc cartridge comprising a magnetic disc medium contained for rotation in a casing having a magnetic head insertion opening for giving a magnetic head access to the magnetic disc medium, a shutter member for opening and closing the magnetic head insertion opening and a distinguishing means for distinguishing the storage capacity of the magnetic disc medium contained in the casing, wherein the improvement comprises that said distinguishing means comprises a distinguishing hole which is formed in the vicinity of a corner of the casing and represents a reference storage capacity and at least one distinguishing opening formed with its center positioned on a second straight line which is parallel to a first straight line passing through the center of the distinguishing hole in parallel to a side edge of the casing and is off from the first straight line inward or outward so that no part of the distinguishing opening intersects the first straight line.

Though depending on the size of the distinguishing opening, the distance between the first and second straight lines should be not smaller than 1.5 mm and preferably not smaller than 2.0 mm.

The distinguishing opening may be a cutaway portion open in a side face of the casing. Further the distinguishing opening may be either a through hole extending through the casing or a blind hole open in the bottom face of the casing.

In the magnetic disc cartridge of the present invention, since the distinguishing opening is shifted from the distinguishing hole, it can be formed in a vacant space without fear of being mistaken for a distinguishing hole for other storage capacity and without fear of adversely affecting other distinguishing holes or a write protector. Further since the distinguishing hole and the distinguishing opening are collectively disposed close to each other, the sensors for detecting the distinguishing hole and the distinguishing opening can be collectively disposed on a disc drive system, whereby the disc drive system can be compact in size. Further since the distinguishing opening is shifted from the distinguishing hole, the distinguishing opening does not interfere with the medium sensor to cause malfunction of the medium sensor.

Further the distinguishing hole and the distinguishing opening permit to distinguish the storage capacity of the magnetic disc medium contained in the magnetic disc cartridge without reading out the signal from the disc medium. That is, the storage capacity of the magnetic disc medium contained in the magnetic disc cartridge can be known without bringing a magnetic head into contact with the disc medium, whereby the information recorded on the disc medium can be well protected.

DESCRIPTION OF THE PREFERRED EMBODIMENT

Figure 1:
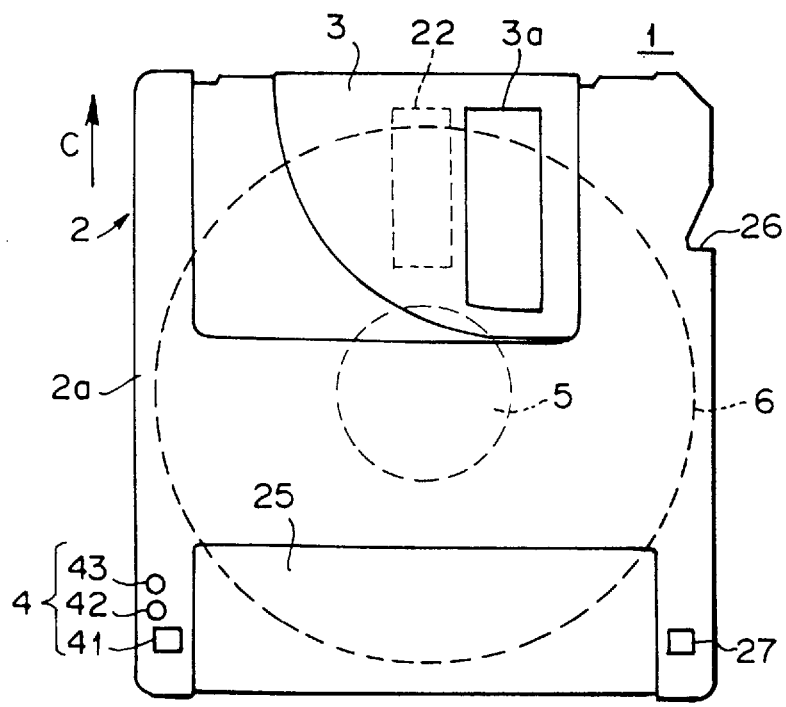
FIG. 1 is a plan view of a magnetic disc cartridge in accordance with an embodiment of the present invention.
Figure 2:
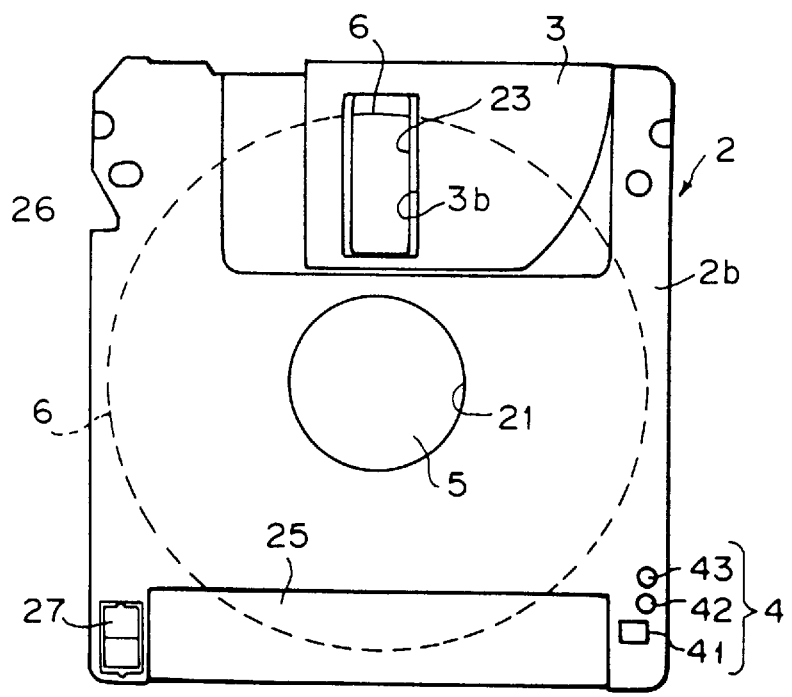
FIG. 2 is a bottom view of the same with the shutter member opened.

In FIGS. 1 and 2, a novel magnetic disc cartridge 1 has a hard casing 2 formed of a synthetic resin such as acrylonitrile-butadiene-styrene copolymer. A center core 5 is held for rotation in the casing 2 and a magnetic disc medium 6 having a central opening is bonded to the center core 5. The magnetic disc medium 6 comprises magnetic layers formed on opposite sides of a flexible disc base of a polyester sheet or the like.

The hard casing 2 comprises upper and lower shell halves 2a and 2b mated together, and a circular hub hole 21 is formed in the lower shell half 2b of the casing 2 at the center thereof. A disk drive mechanism (not shown) acts on the center core 5 through the hub hole 21. A pair of rectangular magnetic head insertion opening 22 and 23 are formed respectively in the upper and lower shell halves 2a and 2b of the casing 2. A shutter member 3 is mounted on the hard casing 2 to be slidable left and right to open and close the head insertion openings 22 and 23.

The shutter member 3 is formed of metal such as stainless steel, aluminum or the like or plastic such as polyacetal resin and is like a channel in cross-section. The shutter member 3 comprises an upper plate portion which covers the upper side of the front (as seen in the direction of insertion of the cartridge 1, that is, the direction of arrow C) edge portion of the hard casing 2, a lower plate portion which covers the lower side of the front edge portion of the hard casing 2 and a connecting portion which connects the upper and lower plate portions so as to cover the front end face of the casing 2. The upper and lower plate portions are respectively provided with openings 3a and 3b.

The shutter member 3 is normally urged by a torsion spring (not shown) toward its closing position shown in FIG. 1 where the openings 3a and 3b are out of alignment with the head insertion openings 22 and 23 and the head insertion openings 22 and 23 are closed. That is, normally the head insertion openings 22 and 23 are closed by the shutter member 3 so that foreign matters such as dust cannot enter the hard casing 2. FIG. 2 shows the magnetic disc cartridge 1 where the shutter member 3 is in its closing position.

In the rear left corner of the casing 2, there is provided a storage capacity distinguishing means 4 for distinguishing the storage capacity of the disc medium 6 contained in the casing 2. The distinguishing means 4 comprises a first distinguishing hole 41 which is formed near the rear edge of the casing 2 and is square in shape and a pair of second distinguishing holes 42 and 43 which are disposed on the front side of the first distinguishing hole 41 and are circular in shape.

The distinguishing holes 41, 42 and 43 extend through both the upper and lower shell halves 2a and 2b, and the second distinguishing holes 42 and 43 are formed with their centers positioned on a straight line b which is parallel to a straight line a passing through the center of the first distinguishing hole 41 in parallel to a longitudinal side edge (a side edge extending in the direction of insertion C) of the casing 2 and is off from the straight line a outward by a predetermined distance d.

For example, when the diameters of the second distinguishing holes 42 and 43 are 3 mm, the distance d between the straight lines a and b should be not smaller than 1.5 mm and preferably not smaller than 2.0 mm so that the second distinguishing holes 42 and 42 are completely off from the straight line a and no part of the second distinguishing holes 42 and 43 intersects the straight line a.

The distinguishing holes 41, 42 and 43 are formed in the triangular area defined by the outer rib 2c of the casing and an oblique inner rib 2d which is formed inside of the casing 2.

Whether or not the first distinguishing hole 41 exists represents whether the storage capacity of the disc medium 6 is larger than a predetermined reference storage capacity. The first distinguishing hole 41 is formed in the part corresponding to the part of the conventional magnetic disc cartridge where a write protector is provided in order to prevent accidental erasure of recorded information on the novel magnetic disc cartridge 1 when the novel magnetic disc cartridge 1 is loaded in a disc drive system for conventional magnetic disc cartridges (cannot write or read for the novel magnetic disc cartridge) and is of the same shape as the write protector in the conventional magnetic disc cartridge.

Existence of the second distinguishing holes 42 and 43 represents that the storage capacity contained in the magnetic disc cartridge is a predetermined storage capacity larger than the reference storage capacity. For example, that only the second distinguishing hole 42 exists represents a first predetermined storage capacity larger than the reference storage capacity, that only the second distinguishing hole 43 exists represents a second predetermined storage capacity larger than the reference storage capacity, and that both the second distinguishing holes 42 and 43 exist represents a third predetermined storage capacity larger than the reference storage capacity. That is, in this case, the storage capacity of the disc medium can be represents in three bits by the three distinguishing holes, the first distinguishing hole 41 and the second distinguishing holes 42 and 43.

A disc drive system for the novel magnetic disc cartridge is provided with a detecting means for detecting the three distinguishing holes 41, 42 and 43. Such a detecting means may comprise a pair of detectors one for detecting the first distinguishing hole 41 and the other for detecting the second distinguishing holes 42 and 43, or a single detector for detecting all the three distinguishing holes 41, 42 and 43 by itself, or three detectors each for detecting one of the three distinguishing holes 41, 42 and 43. Further each detector may be of an optical type or a contact type or the like.

A shallow recess 25 for applying a label is formed in the rear edge portion of the casing 2 at the center thereof.

Further in the right side edge portion of the casing 2 opposite to the side edge portion where the distinguishing holes 41 to 43 are formed, there is provided a write protector 27 and there is provided in the front side of the write protector a cutaway portion 26 for preventing the magnetic disc cartridge 1 from being inserted into a drive system in a wrong direction.

The second distinguishing holes 42 and 43 may be off from the straight line a inward. Also in this case, the distance d between the straight lines a and b should be not smaller than 1.5 mm and preferably not smaller than 2.0 mm.

Further each of the second distinguishing holes 42 and 43 may be a blind hole which opens only in the lower shell half 2b.

Figure 3:
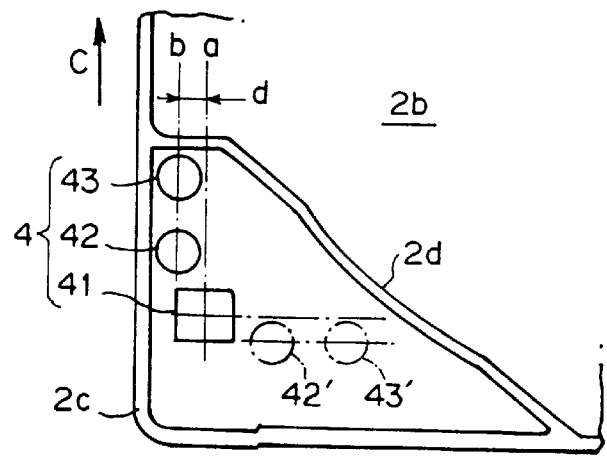
FIG. 3 is a view showing the inside of the lower shell around the distinguishing holes.

Further as shown by the chained line in FIG. 3, the second distinguishing holes 42' and 43' may be arranged along the rear edge perpendicular to the direction insertion C.

Figure 4:
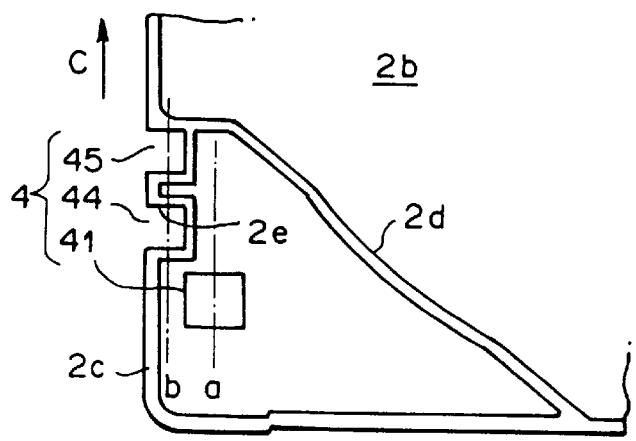
FIG. 4 is a view similar to FIG. 3 but showing the inside of the lower shell of a magnetic disc cartridge in accordance with another embodiment of the present invention.

FIG. 4 shows the inside of the lower shell half 2b of a magnetic disc cartridge in accordance with another embodiment of the present invention. The magnetic disc cartridge of this embodiment is provided with a pair of cutaway portions 44 and 45 in place of the second distinguishing holes. That is, a first distinguishing hole 41 and the cutaway portions 44 and 45 are formed in the left rear corner of the casing 2. The cutaway portions 44 and 45 are formed with their centers positioned on a straight line b which is parallel to a straight line a passing through the center of the first distinguishing hole 41 in parallel to a longitudinal side edge (a side edge extending in the direction of insertion C) of the casing 2 and is off from the straight line a outward by a predetermined distance d. The cutaway portions 44 and 45 are open in the longitudinal side edge of the lower shell half 2b and the distance d between the lines a and b is sufficiently large so that no part of the cutaway portions 44 and 45 intersect the line a. The cutaway portions 44 and 45 are not formed in the upper shell half 2a, that is, they are in the form of recesses open only in the lower shell half 2b.

Figure 5A:
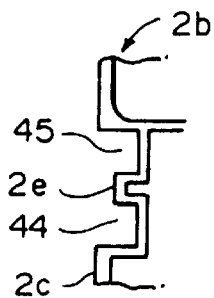
FIGS. 5A and 5B are view illustrating modifications of distinguishing holes.
Figure 5B:
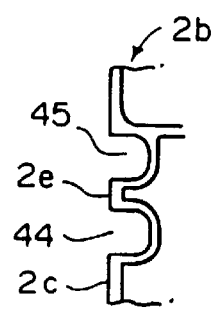

FIGS. 5A and 5B show modifications of the second distinguishing holes 44 and 45 in the form of cutaway portions. In the modification shown in FIG. 5A, the projection 2e between the cutaway portions 44 and 45 is shortened to increase the strength thereof. In the modification shown in FIG. 5B, the bottom corners of the cutaway portions 44 and 45 are rounded to increase the strength of the projection 2e.

What is claimed is:

1. A magnetic disc cartridge comprising a magnetic disc medium contained for rotation in a casing having a magnetic head insertion opening for giving a magnetic head access to the magnetic disc medium, a shutter member for opening and closing the magnetic head insertion opening and a distinguishing means for distinguishing the storage capacity of the magnetic disc medium contained in the casing, wherein the improvement comprises that said distinguishing means comprises a distinguishing hole which is formed in the vicinity of a corner of the casing and represents a reference storage capacity and at least one distinguishing opening formed with its center positioned on a second straight line which is parallel to a first straight line passing through the center of the first distinguishing hole in parallel to a side edge of the casing and is off from the first straight line inward or outward so that no part of the distinguishing opening intersects the first straight line.

2. A magnetic disc cartridge as defined in claim 1 in which said distinguishing opening is in the form of a cutaway portion open in a side face of the casing.

3. A magnetic disc cartridge as defined in claim 1 wherein the first straight line and the second straight line are separated by a distance of at least 1.5 mm.

4. A magnetic disc cartridge as defined in claim 1 wherein the first straight line and the second straight line are separated by a distance of at least 2.0 mm.

5. A magnetic disc cartridge as defined in claim 1 wherein the distinguishing opening is in the form of a through hole through the casing.

6. A magnetic disc cartridge as defined in claim 1 wherein the distinguishing opening is in the form of a blind hole open only in a bottom face of the casing.

7. A magnetic disc cartridge as defined in claim 1 wherein the distinguishing hole is formed in an area bounded by an outer rib of the casing and an oblique inner rib formed in the casing.

8. A magnetic disc cartridge as defined in claim 7 wherein the distinguishing hole is formed in an area bounded by an outer rib of the casing and an oblique inner rib formed in the casing.

9. A magnetic disc cartridge as defined in claim 1 wherein the at least one distinguishing opening is formed in an area bounded by an outer rib of the casing and an oblique inner rib formed in the casing.

* * * * *